(12) United States Patent
Hung

(10) Patent No.: US 6,567,599 B2
(45) Date of Patent: *May 20, 2003

(54) INTEGRATED OPTIC DEVICE MANUFACTURE BY CYCLICALLY ANNEALED PROTON EXCHANGE PROCESS

(75) Inventor: Henry Hung, Paradise Valley, AZ (US)

(73) Assignee: Donald J. Lenkszus, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/777,000

(22) Filed: Feb. 5, 2001

(65) Prior Publication Data

US 2002/0035856 A1 Mar. 28, 2002

Related U.S. Application Data

(63) Continuation of application No. 09/145,041, filed on Sep. 1, 1998, now Pat. No. 6,185,355.

(51) Int. Cl.[7] ................................................. G02B 6/13
(52) U.S. Cl. ............................... 385/132; 385/2; 65/117
(58) Field of Search ............................... 385/2, 3, 130, 385/131, 132; 65/117

(56) References Cited

U.S. PATENT DOCUMENTS

| | | | | |
|---|---|---|---|---|
| 4,547,262 A | * | 10/1985 | Spillman et al. | 216/24 |
| 4,948,407 A | * | 8/1990 | Bindell et al. | 65/386 |
| 4,984,861 A | * | 1/1991 | Suchoski et al. | 385/2 |
| 5,193,136 A | * | 3/1993 | Chang et al. | 385/129 |
| 6,185,355 B1 | * | 2/2001 | Hung | 385/132 |
| 6,374,005 B2 | * | 4/2002 | Hung | 385/14 |

* cited by examiner

Primary Examiner—Rodney Bovernick
Assistant Examiner—Sarah Song
(74) Attorney, Agent, or Firm—Donald J. Lenkszus

(57) ABSTRACT

A method of manufacturing an integrated optic device having at least one waveguide formed in a surfaced thereof is described. The waveguide is formed utilizing a two-step proton exchange process in which the substrate is bathed in a strong acid and then subjected to a plurality of annealing cycles.

67 Claims, 5 Drawing Sheets

INTEGRATED OPTIC DEVICE MANUFACTURE BY CYCLICALLY ANNEALED PROTON EXCHANGE PROCESS

CROSS REFERENCE TO RELATED APPLICATIONS

This application is a co-pending with and a continuation of Ser. No. 09/145,041 filed Sep. 1, 1998 and issued as U.S. Pat. No. 6,185,355 on Feb. 6, 2001.

BACKGROUND OF THE INVENTION

This invention relates to a method of manufacture of integrated and guided-wave optical devices, including intensity and phase modulators, and to a method of manufacture utilizing an annealed proton exchange process, in particular.

More particularly, the invention relates to the manufacture of annealed proton-exchanged integrated optic chip (IOC) devices which each utilize a $LiNbO_3$ of $LiTaO_3$ substrate.

In a further respect, the invention relates to a process which greatly improves the DC drift problem commonly associated with $LiNbO_3$ and $LiTaO_3$ IOC devices, and which also reduces the insertion loss and improves the fabrication yield of such devices.

A $LiNbO_3$ crystal or substrate has several properties that are useful in photonics. The most useful property is the electro-optic (EO) effect. When an electric field is applied to the LiNbO3 crystal, the refractive index is changed according to the strength of the electric field. If and optical wave is traveling through the crystal, the electric field also modulates the phase of the optical signal. The ability of the electric field to modulate the phase of the optical signal is called the electro-optic (EO) effect. The EO effect is, however, limited. To take advantage of the EO effect, a compact waveguide structure is formed on the $LiNbO_3$ (lithium niobate) crystal.

A lithium niobate crystal is processed in a wafer form in a manner similar to that utilized to process silicon crystals or wafers. A waveguide is formed in the lithium niobate crystal simply by increasing the refractive index in selected areas of the crystal. The waveguide ordinarily is only a few microns wide and thus is compatible with the dimension of an optical fiber.

Integrated optic chips (IOCs) were developed in the 1980s. Thousands of IOCs have been installed in CATV transmission equipment, digital telecommunications network equipment, fiber-optic gyros (FOGs), optical switches, and optical sensors. Advantages of IOCs include low-optical loss, low-voltage drive, high-frequency bandwidth, and small size and weight. Various types of IOCs are illustrated in FIG. 1.

Two prior art methods are utilized to fabricate $LiNbO_3$ devices. Both methods utilize conventional photolithography and vacuum deposit techniques found in semiconductor processing.

The first prior art method for fabricating $LiNbO_3$ devices is the titanium in-diffusion process. During this process a titanium metal strip is deposited on a $LiNbO_3$ substrate. The substrate and titanium strip are heated to 1050 degrees C. to diffuse titanium into selected portions or areas of the substrate to form waveguide channels in the substrate. Titanium ions diffuse to interstitial sites in the substrate and function collectively as an impurity dopant. The diffusion of titanium ions into the substrate increases the refractive indices of the substrate. The process was developed in the early 1070s.

The second prior art method is the proton exchange process. During this process a masked $LiNbO_3$ substrate is immersed in a molten bath of pure benzoic acid at a temperature below the decomposition point of the acid. The acid causes lithium ion at or near the surface of unmasked areas of the LiNbO3 substrate to be replaced by hydrogen ions from the acid bath. Replacement of $Li^+$ ions with of $H^+$ ions increases the refractive index of the unmasked areas of the substrate to form a waveguide channel(s) in the substrate. The proton exchange process was developed in the early 1980s and improved in the late 1980s.

The proton exchange process has major drawbacks. First, the process ordinarily is carried out with molten benzoic acid. Benzoic acid is a solid crystallized substance at room temperature. Consequently, the benzoic acid must be heated to a temperature over 200 degrees C. in order to carry out the proton exchange process. At this temperature, the vapor pressure of the molten benzoic acid is high and the process can become unstable.

In addition to the processing problems noted above, treatment of a $LiNbO_3$ substrate with benzoic acid produces severe crystal structure damage in the substrate. The substrate must be annealed to reduce the damage. Problems caused by crystal damage include high propagation loss due to scattering, instabilities in the refractive index of the waveguide channels, and degradation of the electro-optic effect. Annealing the substrate minimizes these problems. One of the most important of such problems is DC stability. When an annealed IOC substrate (produced using a benzoic acid bath) is utilized for the Mach-Zehnder Interferometer (MZI) or switched, the IOC substrate may need to be biased with an electric voltage to operate properly. For example, in the CATV modulator application, a MZI needs to be biased at the so-called "quadrature" ($\pi/2$) point to achieve maximum linearity. For a switch application, a bias voltage is needed to maintain the device in minimum of maximum light transmission.

After a $LiNbO_3$ substrate is processed in a molten benzoic acid bath, the residual crystal damage and mobile charge migration present in the substrate cause the present bias point for the IOC to drift from the original set point of the $\pi$ phase over a period of time (See FIG. 2). This drift occurs at a very low frequency (0.001 Hz to 0.0001 Hz) and is called DC drift. The period of time which passes before such drift occurs can be as short as a few minutes or as long as several hours. Once drift occurs, the MZI is biased at an incorrect point and the modulated signal includes severe non-linearity. The DC drift may eventually even move beyond the maximum supplied voltage from the power supply. If this occurs, the entire transmission system must be reset in order to operate. Such DC voltage drift can therefore seriously compromise the integrity of the MZI.

DC drift is believed to occur because of the mobile charge and ions that are produced during treatment of a $LiNbO_3$ substrate in a benzoic acid bath. When a bias voltage $LiNbO_3$ substrate is applied to the substrate, the mobile charge and ions in the waveguide region slowly move toward opposing polarity electrodes and set up a counter electric field which cancels the applied E-field from the electrode. This is illustrated in FIG. 3.

The severity or magnitude of DC bias drift can vary among substrates processed in a molten benzoic acid bath.

One solution to the DC drift problem is providing a mechanism for resetting the bias point with a refreshing voltage directed to the bias electrodes of the IOC. The refreshing voltage restores the IOC to its original setting. The utilization of a refreshing voltage, however, requires the use of a monitoring system to measure the drift and initiate the necessary resetting sequence. This makes the system design much more complicated and renders the IOC useless for many applications.

In the past, sulfuric acid has sometimes been utilized to treat $LiNbO_3$ substrates. The use of sulfuric acid has not been preferred because it resulted in high loss and lower yield of serviceable substrates.

Accordingly, it would be highly desirable to provide an improved IOC substrate and method for making the same which would eliminate or minimize DC drift in the IOC.

Therefore, it is a principal objective of the invention to provide an improved IOC and method for making same.

A further objective of the invention is to provide an improved IOC in which DC drift is minimized or is substantially eliminated so that a modulator or switch can be produced which can maintain its bias for extended periods of time.

These and other further and more specific objectives and advantages of the invention will be apparent to those skilled in the art from the following detailed description thereof, taken in conjunction with the drawings, in which.

Briefly, in accordance with the invention, I have discovered an improved integrated optic (10) device. The device includes a crystalline material substrate having at least one surface; and an integrated optic circuit. The circuit includes an optical waveguide and at least one electrode disposed in juxtaposition on the surface to provide at least one integrated optic region thereon. The optical waveguide is formed in the surface by a two step proton exchange process comprising the steps of immersing the substrate for a period of time in a heated bath including at least 70% by weight of a strong acid; and cyclically differentially annealing the substrate by heating and cooling the substrate through at least first and second annealing cycles. Each annealing cycle comprises first heating the substrate through an up-ramp to an elevated temperature above room temperature, and then cooling the substrate through a down-ramp to a low temperature, which is at least seventy-five degrees C. lower than the elevated temperature.

In another embodiment of the invention, I have discovered an improved method of fabricating a proton exchanged integrated optic device. The improved method comprises the steps of preparing a crystalline material substrate with at least one surface; forming channels in the surface to produce a selected integrated optic device waveguide; immersing the substrate in a heated bath of strong acid; and cyclically differentially annealing the substrate by heating and cooling the substrate through at least first and second annealing cycles. Each annealing cycle comprises first heating the substrate through an up-ramp to an elevated temperature, and then cooling the substrate through a down-ramp to a low temperature which is at least seventy-five degrees C. lower than the elevated temperature.

Figure 1:
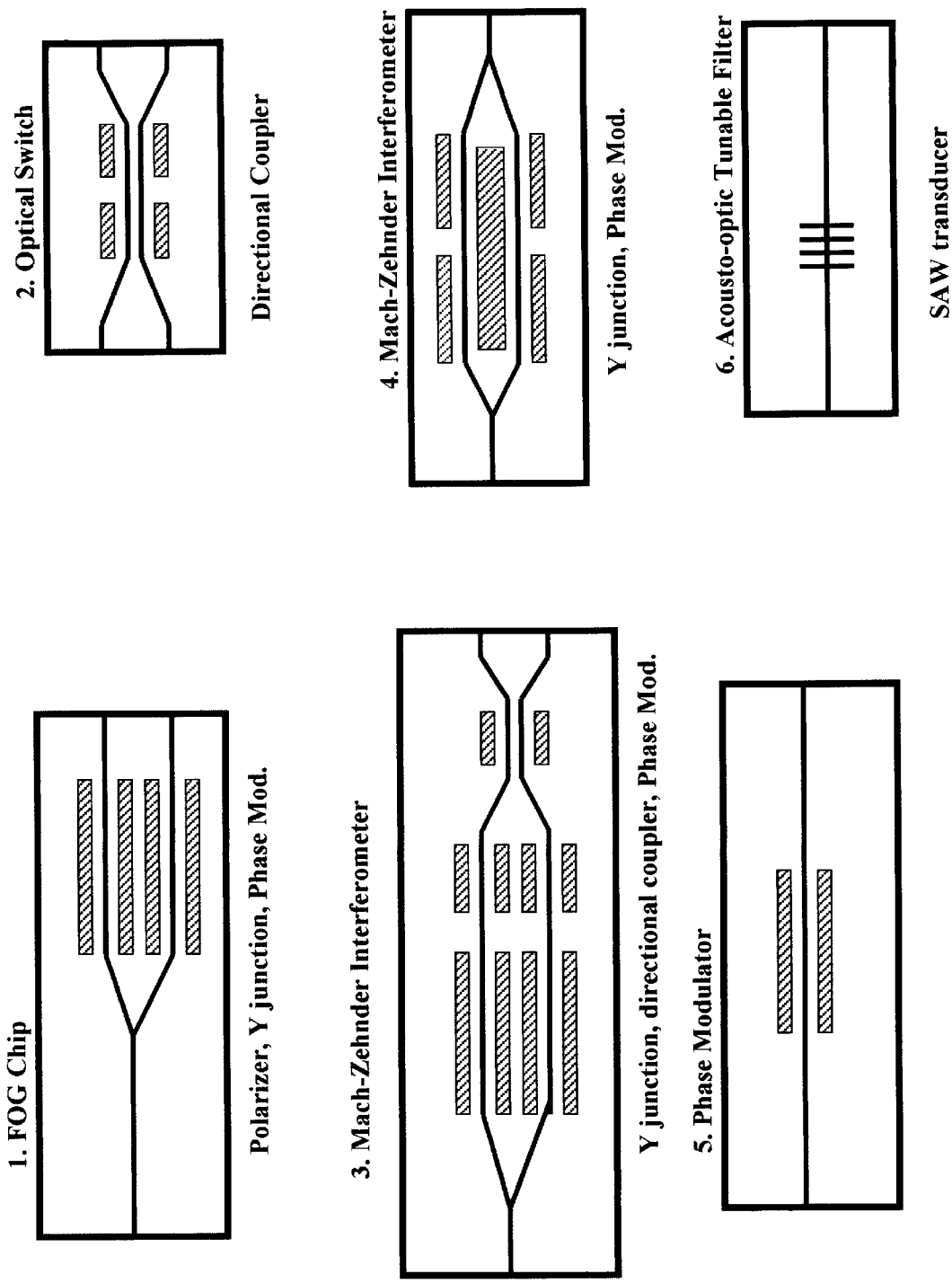
FIG. 1 illustrates various kinds of integrated optic chips.
Figure 2:
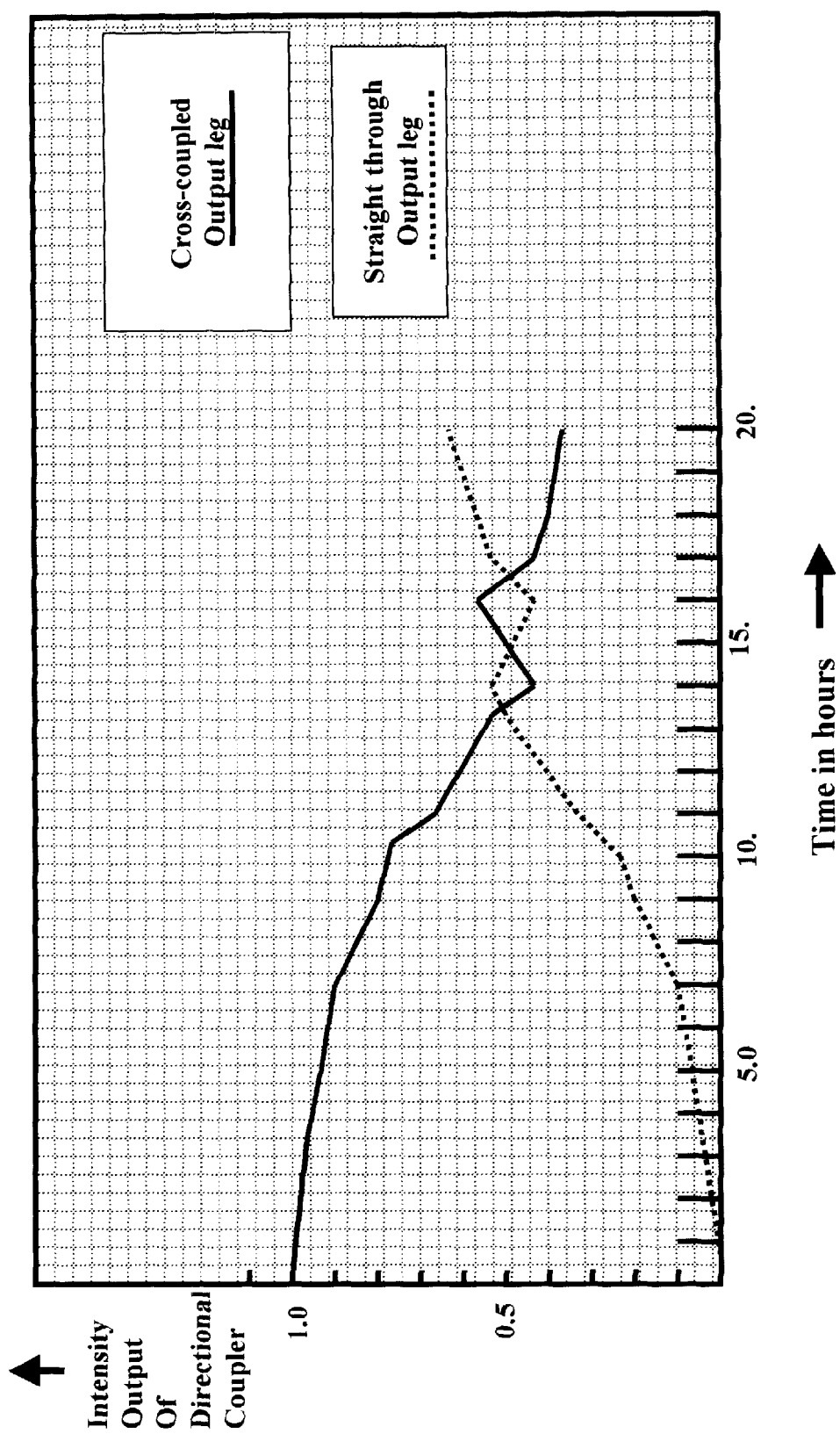
FIG. 2 is a graph illustrating the drift with time of the DC bias point in a conventional modulator or switch.
Figure 3:
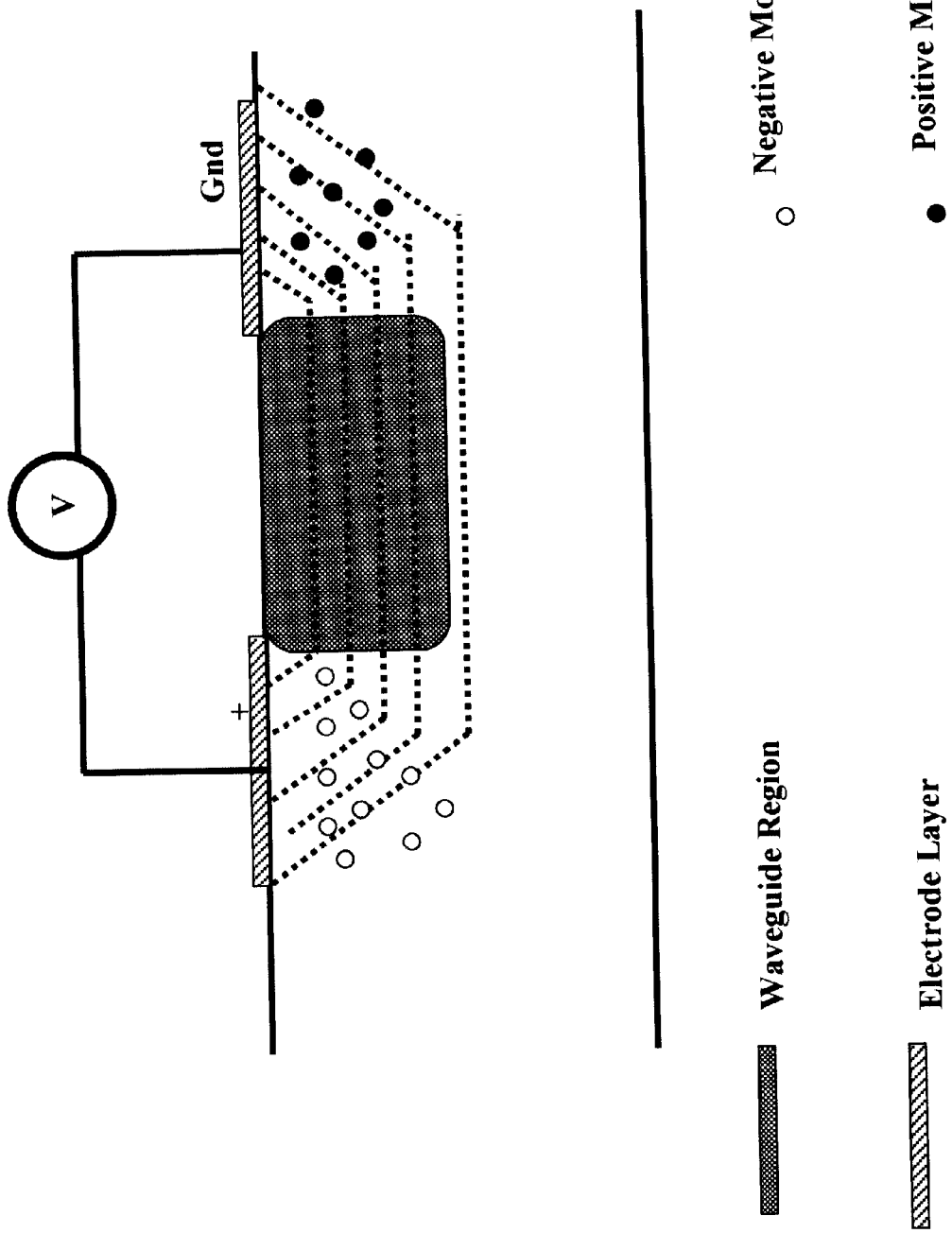
FIG. 3 illustrates theoretical mobile charge/ion migration to produce the opposite field to an applied voltage.

According to the invention, IOC waveguides of the type shown in FIG. 1 are produced using the following procedure.

1. A surface of a $LiNbO_3$ (or $LiTaO_3$) substrate is cleaned to produce a particle-free surface. A masking layer is fabricated on the substrate surface with a metal such as aluminum, gold, or platinum, or, with a dielectric such as silicon dioxide or silicon nitride. The layer is produced utilizing conventional photolithography and/or vacuum deposition processes. The processes can be either an etch-away or lift-off process.

2. An acid resistant, sealable container is filled with sulfuric acid. The strength of the sulfuric acid can vary but is presently preferably in the range of about 70% to 98% by weigh sulfuric or another strong acid. By way of example, 85% by weight sulfuric acid includes 85% sulfuric acid and 15% by weight water, 98% by weight sulfuric acid includes 98% by weight sulfuric acid and 2% by weight water. The invention is especially useful when a crystalline substrate is immersed in a heated strong acid like sulfuric, nitric, phosphoric, or hydrochloric (assuming the chlorine does not pose a contamination problem) acid. Hydrofluoric acid, though a strong acid, is not utilized because it excessively contaminates the substrate. Even though, for example, the use of sulfuric acid is sometimes referred to in the prior art, the damage caused to a $LiNbO_3$ substrate by such acid has made use of strong acids impractical. The invention is believed, in contrast to such prior art experience which suggests strong acids are impractical, to permit a substrate to be placed in a strong acid at a relatively low temperature.

The $LiNbO_3$ substrate is loaded into a holder and submersed in the sulfuric acid. The container is closed. The sulfuric acid is heated utilizing conventional heating apparatus and temperature monitoring and control circuitry.

3. When the temperature of the sulfuric acid reaches a predetermined exchange temperature in the range of from about 100 degrees C. to 180 degrees C., the substrate is permitted to soak in the sulfuric acid for a selected period of time, typically in the range of about 70 to 200 minutes, and then is removed from the sulfuric acid. When the substrate is in the sulfuric bath, proton exchange occurs at the surfaces of the substrate not covered by the masking material.

4. The substrate is cleaned and the mask layer is etched off the substrate.

Figure 5:
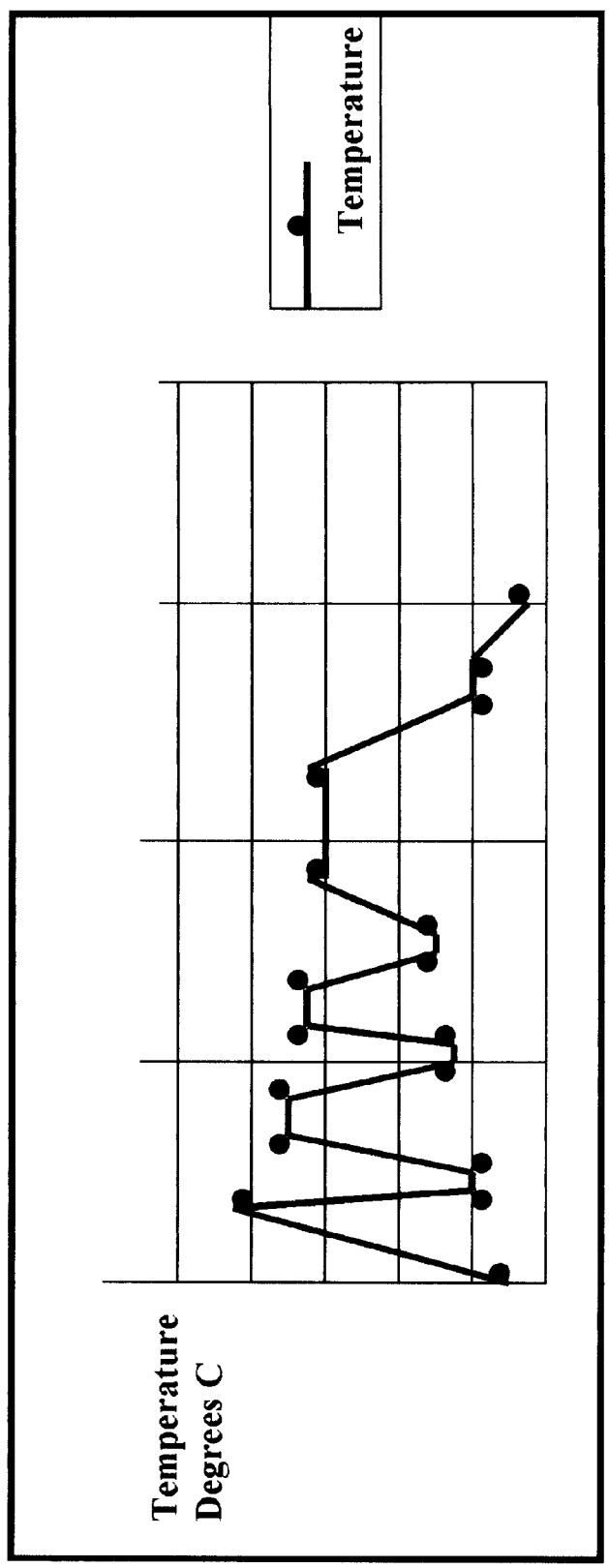
FIG. 5 is a graph illustrating a multiple-ramp, multi soak annealing process carried out in accordance with the principle of the invention.

5. The substrate is loaded into a furnace and is annealed for two to twenty hours using multiple soak, ramped steps of the type illustrated in FIG. 5. In FIG. 5, the numbers "0", "2", "4", etc. on the horizontal axis of the graph represent time in hours. Oxygen flows into the furnace at a rate of about 1 to 10 liters, preferably two to four liters, per minute, at a relative humidity of 70% or more. Oxygen is the only gas introduced into the furnace and produces a pure oxygen atmosphere in the furnace. If desired, however, an oxygen-nitrogen or 100% nitrogen gas atmosphere can be utilized in the furnace instead of the oxygen gas atmosphere. Even hydrogen or helium could be utilized in the furnace. Hydrogen and helium are not normally practical because of cost or because of danger of explosion. Pure oxygen is the presently preferred gas atmosphere in the annealing furnace or oven. The inclusion of water vapor in the furnace atmosphere is important in the practice of the invention. The water vapor is believed critical in removing the $OH^+$ ions from the substrate during annealing. is important in the practice of the invention. The water vapor is believed critical in removing the $OH^-$ ions from the substrate during annealing.

In FIG. 5, the substrate is placed into the furnace at room temperature and during the first ramp-up, the temperature in the furnace is increased to a "high temperature soak" of 400 degrees C. The rate at which the temperature increases (on an "up-ramp") or decreases (on a "down-ramp") in the furnace is preferably in the range of one to twenty degrees C., preferably two to five degrees C. per minute. The furnace temperature is maintained at a high temperature soak of 400 degrees C. for a short period of time, then the temperature is down-ramped to a low temperature soak at 100 degrees C. The temperature is maintained at a low temperature soak at 100 degrees C. for a few minutes, and then is up-ramped to a high temperature soak of 350 degrees C. After a few minutes at a high temperature soak of 350 degrees C., the temperature is down-ramped to a low temperature soak at 125 degrees C.; is up-ramped to a high temperature soak at 325 degrees C.; is down-ramped to a low temperature soak at 150 degrees C.; is up-ramped to a high temperature soak at 300 degrees C.; is down-ramped to a low temperature soak at 100 degrees C.; and then is cooled to room temperature.

The cyclical heating and cooling of the substrate in the annealing furnace is believed critical in the practice of the invention, and requires that the substrate be subjected at least twice to an annealing cycle. The annealing cycle consists of heating (i.e., up-ramping) the substrate to an elevated temperature and then cooling (i.e., down-ramping) the substrate to a temperature lower than the elevated temperature achieved during the preceding ramp-up. The substrate is preferably subjected to this annealing cycle three or more times. By way of example, when a substrate is heated (i.e., is up-ramped) from room temperature to 350 degrees C., is cooled (i.e., is down-ramped) from 350 degrees C. to 100 degrees C., is heated (up-ramped) from 100 degrees C. to 350 degrees C., and is cooled (down-ramped) from 350 degrees C. to room temperature, then the substrate has been subjected to two annealing cycles.

The temperature differential between the high temperature and the low temperature during each up-ramp (or down-ramp) cycle is also believed critical in the practice of the invention. If, for example, a substrate is heated from a room temperature of 50 degrees C. to 350 degrees C. and is then cooled or down-ramped to 150 degrees C., then the temperature differential during the down-ramp is 350 degrees C. minus 150 degrees C. which equals a temperature differential of 200 degrees C. The temperature differential during the up-ramp is 350 degrees C. minus 50 degrees C. which equals a temperature differential of 300 degrees C. In the practice of the invention, each up-ramp or down-ramp temperature differential should be at least 75 degrees C., preferably at least 100 degrees C. These temperature differentials are believed important because heating the substrate expands the substrate while cooling the substrate contracts the substrate. Such expansion and contraction of the substrate is believed to facilitate the movement of mobile charges in the substrate so they can be removed from the substrate—much in the same manner that periodic stretching of clothing by a washing machine facilitates removal of dirt particles from clothing in the washing machine.

While the high temperature to which a substrate is heated at the conclusion of an up-ramp can vary as desired, ordinarily the substrate is heated to at least 250 degrees C. at the conclusion or "top" of an up-ramp to a maximum high temperature of only about 150 degrees C. is not preferred because the annealing process does not appear to have any noticeable effect. Heating the substrate at the conclusion of an up-ramp to a high temperature between 150 degrees and 250 degrees, while having some annealing effect, is not presently preferred because the annealing effect is too small and processing of the substrate consumes too much time. The low temperature reached at the conclusion of a down ramp during the cyclical annealing of a substrate can be room temperature or lower, but typically usually at least 50 degrees C. at the conclusion of each down-ramp, except during the final down-ramp of the annealing process when the substrate is normally cooled to room temperature.

During the cyclical annealing of a substrate in the preferred practice of the invention, the substrate is typically up-ramped or heated from a beginning temperature to a high temperature of at least 250 degrees C. and is down-ramped or cooled from said high temperature to a low temperature no lower than about 50 degrees C. The time for which a substrate is maintained at a particular high temperature or low temperature can vary as desired.

An up-ramp is a line indicating how the temperature of a substrate changes while the substrate is heated from a beginning temperature to a selected elevated temperature. The up-ramp line ordinarily is straight, but need not be (i.e., the rate at which the temperature of the substrate changes need not be constant during the entire up-ramp line). A down-ramp is a line indicating how the temperature of a substrate changes while the substrate is cooled from a beginning elevated temperature to a lower temperature. The down-ramp line ordinarily is straight, but need not be.

It is possible during the practice of the invention to up-ramp or heat a substrate and down-ramp of cool a substrate through a complete single annealing cycle and then to let any desired amount of time pass before the substrate is subjected to a subsequent up-ramp down-ramp annealing cycle. Practically speaking, however, it is presently preferred that each subsequent annealing cycle occurs promptly after the prior annealing cycle (if any) is completed.

In order to facilitate the expansion and contraction of the substrate to promote the movement of mobile charges in the substrate, the temperature of the substrate presently changes at a rate of one degree to twenty degrees, preferably two to five degrees per minute during an up-ramp or down-ramp in the annealing furnace. If the temperature change during an up-ramp occurs too slowly or too quickly, then the ability of mobile charges to move in the substrate appears adversely affected.

Figure 4:
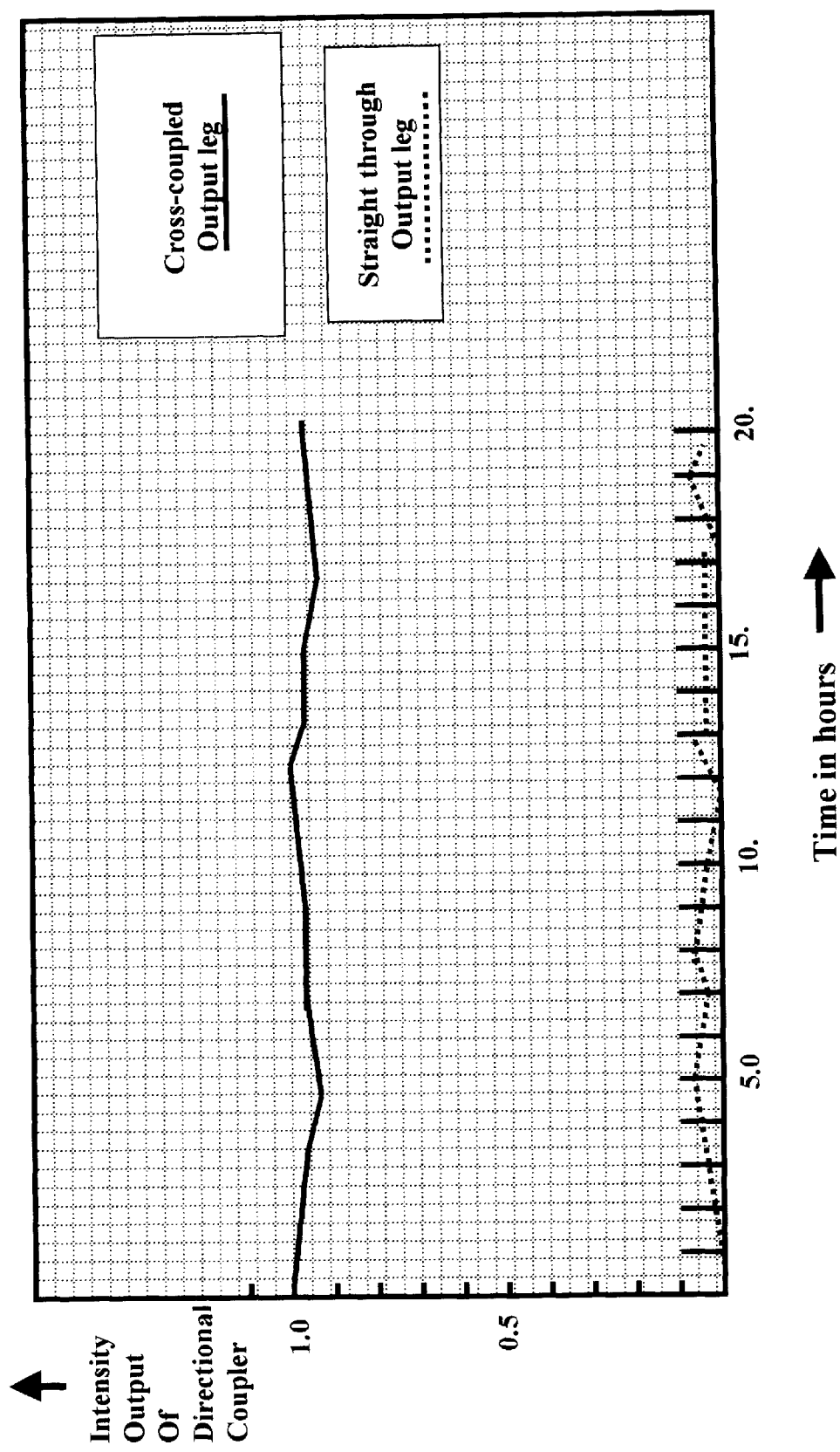
FIG. 4 is a graph illustrating the stability of the DC bias point of an IOC modulator or switch produced in accordance with the method of the invention.

6. After annealing is completed, an electrode pattern is fabricated on the surface of the substrate utilizing conventional photolithography and vacuum deposition techniques to form a metal electrode(s) layer. The resulting IOC substrate is polished, diced, fiber pigtailed, and wire bonded. The finished IOC is tested with a bias voltage to evaluate its response and DC stability. A typical DC stability in a biased directional coupler switch produced in accordance with the invention is illustrated in FIG. 4.

Having described my invention in such term as to enable those skilled in the art to understand and practice it, and having identified the presently preferred embodiments thereof, I claim:

1. An improved annealed proton exchange method of manufacturing an integrated optic device to provide an optical waveguide disposed on a first surface of a substrate of crystalline material, said method comprising the steps of:

masking said substrate to define an optical waveguide portion on said first surface;

immersing said substrate in a heated bath comprising a strong acid; and subjecting said substrate to annealing, said annealing comprising first and second anneal cycles, said first cycle comprising heating said substrate in accordance with a first predetermined rate curve to a first elevated temperature and cooling said substrate in accordance with a second predetermined rate curve to a first low temperature, said first low temperature being lower than said first elevated temperature by a first predetermined amount, and said second cycle being subsequent to said first anneal cycle and comprising heating said substrate above said first low temperature in accordance with a third predetermined rate curve to a second elevated temperature and cooling said substrate from said second elevated temperature in accordance with a fourth predetermined rate curve to a second low temperature that is lower than said second elevated temperature by a second predetermined amount.

2. A method in accordance with claim 1, comprising:
selecting said strong acid is selected from the group consisting of sulfuric acid, nitric acid, phosphoric acid and hydrochloric acid.

3. A method in accordance with claim 1, comprising:
selecting said sulfuric acid as said strong acid.

4. A method in accordance with claim 3, comprising:
selecting lithium niobate as said substrate.

5. A method in accordance with claim 3, comprising:
selecting as said substrate a $LiTaO_3$ substrate.

6. A method in accordance with claim 1, comprising:
selecting a lithium niobate substrate as said substrate.

7. A method in accordance with claim 1, comprising:
selecting a substrate of $LiTaO_3$.

8. A method in accordance with claim 1, comprising:
providing said heated bath with at least 70% by weight of said strong acid.

9. A method in accordance with claim 8, comprising:
selecting said strong acid from the group consisting of sulfuric acid, nitric acid, phosphoric acid and hydrochloric acid.

10. A method in accordance with claim 9, comprising:
selecting said strong acid as sulfuric acid.

11. A method in accordance with claim 10, comprising:
selecting a lithium niobate substrate as said substrate.

12. A method in accordance with claim 10, comprising:
selecting as said substrate a $LiTaO_3$ substrate.

13. A method in accordance with claim 9, comprising:
selecting as said substrate a lithium niobate substrate.

14. A method in accordance with claim 9, comprising:
selecting a $LiTaO_3$ substrate as said substrate.

15. A method in accordance with claim 1, comprising:
performing said annealing steps in a substantially pure oxygen atmosphere.

16. A method in accordance with claim 15, comprising:
selecting said strong acid from the group consisting of sulfuric acid, nitric acid, phosphoric acid and hydrochloric acid.

17. A method in accordance with claim 15, comprising:
selecting sulfuric acid as said strong acid.

18. A method in accordance with claim 17, comprising:
selecting a lithium niobate substrate as said substrate.

19. A method in accordance with claim 17, comprising:
selecting a $LiTaO_3$ substrate as said substrate.

20. A method in accordance with claim 15, comprising:
selecting a lithium niobate substrate as said substrate.

21. A method in accordance with claim 15, comprising:
selecting as said substrate, a substrate that comprises $LiTaO_3$.

22. A method in accordance with claim 15, comprising:
selecting said heated bath to be at least 70% by weight of said strong acid.

23. A method in accordance with claim 15, comprising:
providing water vapor in said atmosphere.

24. A method in accordance with claim 1, comprising:
performing said annealing in an atmosphere including water vapor.

25. A method in accordance with claim 24, comprising:
selecting said strong acid is selected from the group consisting of sulfuric acid, nitric acid, phosphoric acid and hydrochloric acid.

26. A method in accordance with claim 24, comprising:
selecting sulfuric acid as said strong acid.

27. A method in accordance with claim 26, comprising:
selecting as said substrate, a substrate that comprises lithium niobate.

28. A method in accordance with claim 26, comprising:
selecting as said substrate, a substrate that comprises $LiTaO_3$.

29. A method in accordance with claim 24, comprising:
selecting as said substrate, a substrate that comprises lithium niobate.

30. A method in accordance with claim 24, comprising:
selecting as said substrate, a substrate that comprises $LiTaO_3$.

31. A method in accordance with claim 24, comprising:
selecting said heated bath as comprising at least 70% by weight of said strong acid.

32. A method in accordance with claim 1, comprising:
forming said waveguide as a portion of a Fiber Optic Gyro chip.

33. A method in accordance with claim 1, comprising:
forming said waveguide as a portion of a Mach-Zehnder interferometer.

34. A method in accordance with claim 1, comprising:
forming said integrated optic device as an optical switch.

35. A method in accordance with claim 1, comprising:
forming said waveguide as a portion of a phase modulator.

36. A method in accordance with claim 1, comprising:
forming said waveguide as a portion of an optical switch.

37. A method in accordance with claim 1, comprising:
forming said waveguide as a portion of an acousto-optic tunable filter.

38. A method in accordance with claim 1, comprising:
forming at least one electrode on said substrate disposed proximate said waveguide.

39. A method of forming an optical waveguide on a first surface of a lithium niobate substrate, said optical waveguide is formed in said first surface by an annealed proton exchange process, comprising the steps of:
bathing said substrate in a heated bath comprising a strong acid; and
subjecting said substrate to a plurality of annealing cycles in an atmosphere containing water vapor, at least a first one of said plurality of annealing cycles comprising heating said substrate in accordance with a predetermined heating rate curve to a first elevated temperature and cooling said substrate in accordance with a predetermined cooling rate curve to a first low temperature, said first low temperature being lower than said first elevated temperature by a first predetermined amount, and at least a second one of said plurality of annealing cycles comprising heating said substrate above said first low temperature in accordance with a second predetermined heating rate curve to a second elevated temperature and cooling said substrate from said second elevated temperature in accordance with a fourth predetermined rate curve to a second low temperature that is lower than said second elevated temperature by a second predetermined amount.

40. A method in accordance with claim 39, comprising:
providing said atmosphere as a substantially pure oxygen atmosphere.

41. A method in accordance with claim 40, comprising:
forming said bath to comprise at least 70% by weight of said strong acid.

42. A method in accordance with claim 41, comprising:
forming said bath to comprise 70% to 98% by weight of said strong acid.

43. A method in accordance with claim 42, comprising:
selecting sulfuric acid as said strong acid.

44. In an annealed proton exchange process for forming an optical waveguide disposed in a first surface of a lithium niobate substrate, the steps of:
bathing said substrate in a heated bath comprising a strong acid; and
subjecting said substrate to a plurality of annealing cycles, at least a first one of said plurality of annealing cycles comprising heating said substrate in accordance with a predetermined heating rate curve to a first elevated temperature and cooling said substrate in accordance with a predetermined cooling rate curve to a first low temperature, said first low temperature being lower than said first elevated temperature by a first predetermined amount, and at least a second one of said plurality of annealing cycles comprising heating said substrate above said first low temperature in accordance with a second predetermined heating rate curve to a second elevated temperature and cooling said substrate from said second elevated temperature in accordance with a fourth predetermined rate curve to a second low temperature that is lower than said second elevated temperature by a second predetermined amount, at least one of said first one and said second one of said annealing cycles being performed in an atmosphere containing substantially pure oxygen.

45. A method in accordance with claim 44, comprising:
providing water vapor in said atmosphere.

46. A method in accordance with claim 44, comprising:
selecting said bath to comprise at least 70% by weight of said strong acid.

47. A method in accordance with claim 46, comprising:
selecting said bath to comprise 70% to 98% by weight of said strong acid.

48. A method in accordance with claim 47, comprising:
selecting sulfuric acid as said strong acid.

49. In an annealed proton exchange process for forming an optical waveguide in a first surface of a lithium niobate substrate, comprising the steps of:
subjecting said substrate to heated strong acid;
subsequently subjecting said substrate to a plurality of annealing cycles, at least a first one of said plurality of annealing cycles comprising heating said substrate in accordance with a predetermined heating rate curve to a first elevated temperature and cooling said substrate in accordance with a predetermined cooling rate curve to a first low temperature, said first low temperature being lower than said first elevated temperature by a first predetermined amount, and at least a second one of said plurality of annealing cycles comprising heating said substrate above said first low temperature in accordance with a second predetermined heating rate curve to a second elevated temperature and cooling said substrate from said second elevated temperature in accordance with a fourth predetermined rate curve to a second low temperature that is lower than said second elevated temperature by a second predetermined amount; and
performing at least one of said plurality of annealing cycles in an atmosphere containing water vapor.

50. A method in accordance with claim 49, comprising:
providing a substantially pure oxygen atmosphere as said atmosphere.

51. A method in accordance with claim 49, comprising:
providing said strong acid as a bath comprising at least 70% by weight of said strong acid.

52. A method in accordance with claim 51, comprising:
providing said strong acid as a bath comprising 70% to 98% by weight of said strong acid.

53. A method in accordance with claim 52, comprising:
selecting sulfuric acid as said strong acid.

54. A method, for forming an optical waveguide in a surface a crystalline substrate by an annealed proton exchange process, comprising the steps of:
bathing said substrate in a heated bath comprising a strong acid; and
subjecting said substrate to at least three annealing cycles, at least a first one of said annealing cycles comprising heating said substrate in accordance with a predetermined heating rate curve to a first elevated temperature and cooling said substrate in accordance with a predetermined cooling rate curve to a first low temperature, said first low temperature being lower than said first elevated temperature by a first predetermined amount, and at least a second one of said annealing cycles comprising heating said substrate above said first low temperature in accordance with a second predetermined heating rate curve to a second elevated temperature and cooling said substrate from said second elevated temperature in accordance with a fourth predetermined rate curve to a second low temperature that is lower than said second elevated temperature by a second predetermined amount, at least one of said first one and said second one of said annealing cycles being performed in an atmosphere containing substantially pure oxygen.

55. A method in accordance with claim 54, comprising:
providing said atmosphere as a substantially pure oxygen atmosphere.

56. A method in accordance with claim 54, comprising:
providing said bath as at least 70% by weight of said strong acid.

57. A method in accordance with claim 56, comprising:
providing said bath as comprising 70% to 98% by weight of said strong acid.

58. A method in accordance with claim 57, comprising:
selecting sulfuric acid as said strong acid.

59. A method in accordance with claim 54, comprising:
selecting a lithium niobate substrate as said crystalline substrate.

60. A method for forming an optical waveguide in a first surface of a lithium niobate substrate an annealed proton exchange process, comprising the steps of:
subjecting said substrate to heated strong acid; and
subjecting said substrate to at least three annealing cycles, each cycle comprising heating said substrate from a selected one of a plurality of low temperatures to a selected one of a plurality of high temperatures, said heating being in accordance with a predetermined one of a plurality of heating rate up-ramps, and cooling from each said selected one high temperature to a second selected one of said plurality of low temperatures, said cooling being in accordance with a predetermined one of a plurality of cooling rate down-ramps.

61. A method in accordance with claim 60, comprising:
performing at least one of said three annealing cycles in a substantially pure oxygen atmosphere.

62. A method in accordance with claim 61, comprising:
injecting water vapor into said substantially pure oxygen atmosphere.

63. A method in accordance with claim 62, comprising:
providing said water vapor at a level to produce a relative humidity of at least 70 percent.

64. A method in accordance with claim 61, comprising:
selecting said strong acid to comprise at least 70% by weight sulfuric acid.

65. A method in accordance with claim 64, comprising:
selecting said strong acid to comprise 70% to 98% by weight sulfuric acid.

66. A method in accordance with claim 60, comprising:
selecting sulfuric acid as said strong acid.

67. A method in accordance with claim 60, comprising:
performing at least one of said anneal cycles in an atmosphere having water vapor present at a relative humidity of at least 70 percent.

* * * * *